May 2, 1967 M. B. COLLITO 3,316,914
SURGICAL METHODS AND DEVICES FOR ANASTOMOSIS
Filed Feb. 14, 1963 2 Sheets-Sheet 1
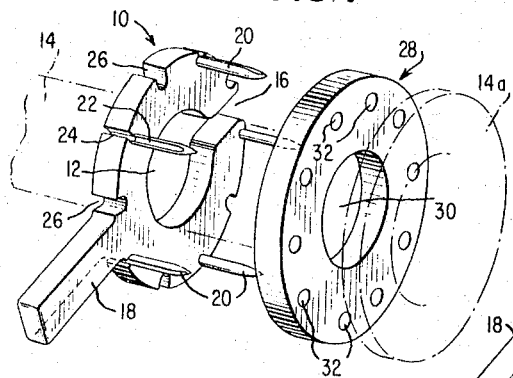
FIG.1
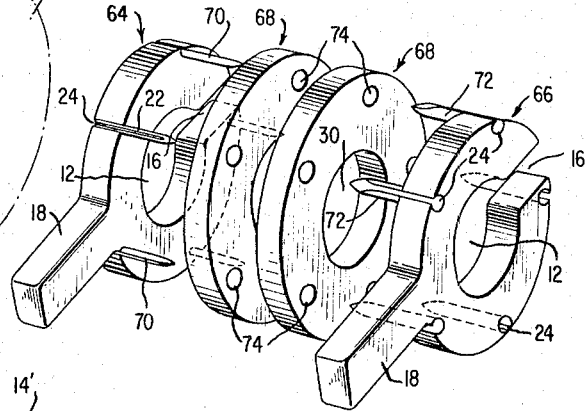
FIG.10
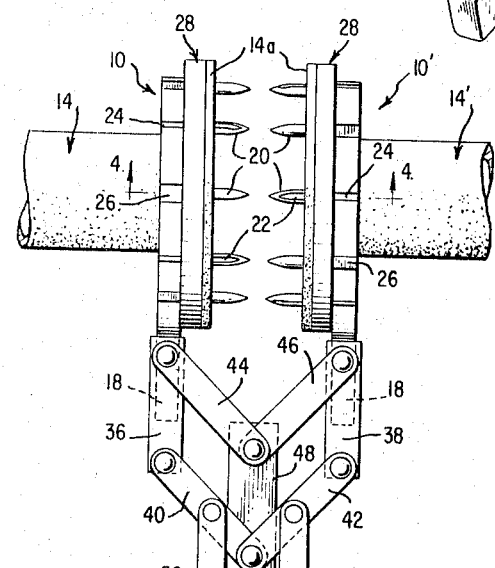
FIG.3
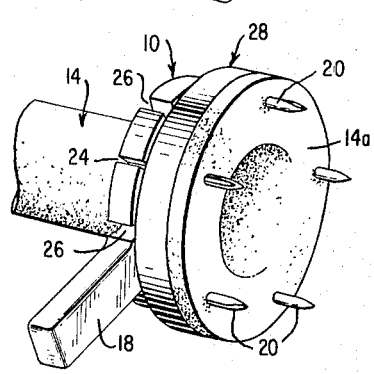
FIG.2
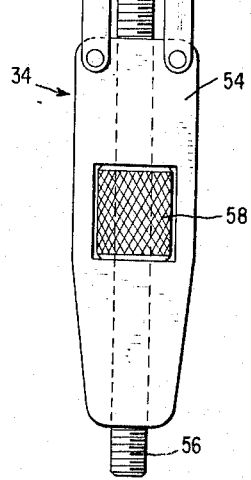
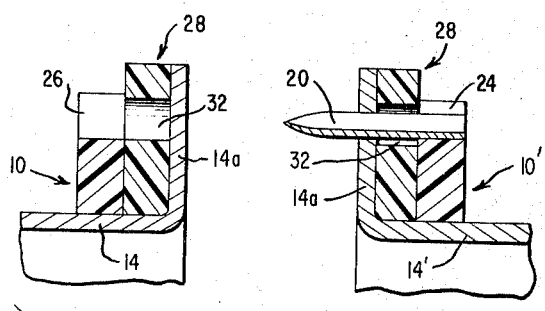
FIG.4
INVENTOR.
MICHAEL B. COLLITO
BY
*Shapiro and Shapiro*
ATTORNEYS May 2, 1967  M. B. COLLITO  3,316,914
SURGICAL METHODS AND DEVICES FOR ANASTOMOSIS
Filed Feb. 14, 1963  2 Sheets-Sheet 2
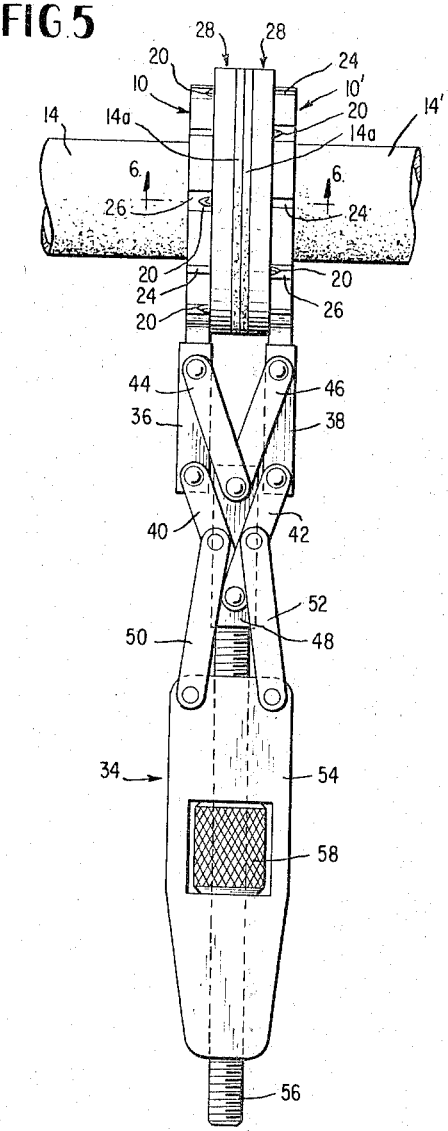
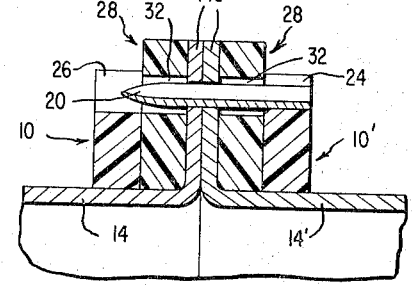
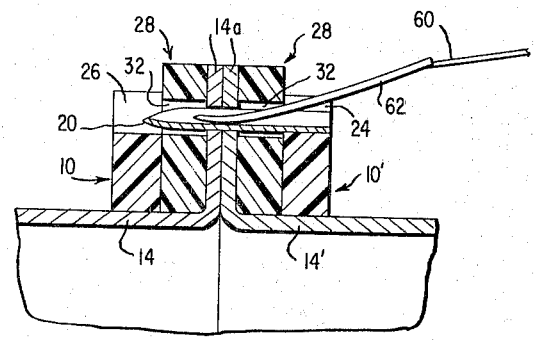
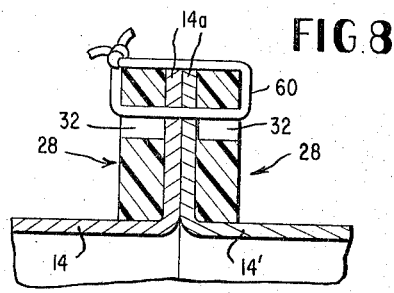
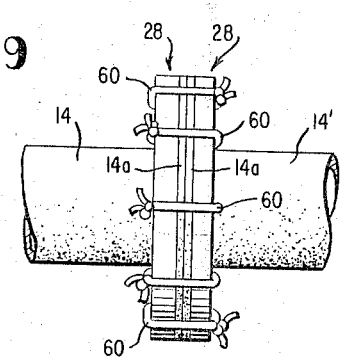
INVENTOR.
MICHAEL B. COLLITO
BY
*Shapiro and Shapiro*
ATTORNEYS United States Patent Office 3,316,914
Patented May 2, 1967

3,316,914
SURGICAL METHODS AND DEVICES
FOR ANASTOMOSIS
Michael B. Collito, South Orange, N.J. (Babies Hospital, 15 Roseville Ave., Newark, N.J. 07107)
Filed Feb. 14, 1963, Ser. No. 258,570
27 Claims. (Cl. 128—334)

This invention relates to surgical methods and devices, and more particularly to methods and devices for anastomosis or the surgical repair of small blood vessels and the like, which do not damage the intima within the area of blood flow.

It has heretofore been proposed to repair blood vessels by removing a damaged or defective portion and joining the ends of the remaining vessel parts. While such procedures are theoretically sound, in practice failures have been experienced due to the difficulties inherent in re-uniting the vessel parts. Procedures employed heretofore in which the ends of the vessel are joined by sutures are difficult and time consuming to execute and produce unreliable results. Not infrequently the junction leaks through the needle punctures, or because of "ballooning" or aneurysmal dilatation of the vessel between the sutures or because of inability to establish a firm abutment of the vessel ends. In co-pending applications, Ser. No. 180,462, filed Mar. 19, 1962 now Patent No. 3,254,650, and Ser. No. 223,092, filed Sept. 12, 1962, now Patent No. 3,254,651, the applicant has disclosed methods and devices directed to the solution of the foregoing and related problems. Broadly speaking, the applicant has heretofore proposed to associate connector parts, such as ring devices, with vessel ends in order to permit the vessel ends to be joined to each other or to other members. The present invention is directed to the provision of improved methods and devices for joining vessel ends or the like or for joining a vessel end with another member, and more particularly to improved methods and devices for facilitating the attachment of connector parts, especially absorbable parts, to vessel ends or the like.

It is accordingly a principal object of the present invention to provide improved surgical methods and devices of the foregoing type.

A further object of the invention is to provide improved methods and devices for anastomosis and similar procedures, which may be employed more rapidly, easily, and reliably than has heretofore been possible.

Another object of the invention is to provide methods and devices of the foregoing type which eliminate the need for leaving nonabsorbable material in the body.

Briefly stated, and without limitation, the present invention is concerned with the placement of a vessel end or the like upon a plurality of prongs which facilitate the attachment of the vessel end to another, similarly prepared vessel end and which may be readily removed. More specifically, the prongs are employed in conjunction with rings, especially of absorbable material, through which the prongs are passed to engage the wall of the outwardly turned vessel end. The prongs are supported by a split sleeve. A pair of such sleeves and associated rings are utilized in conjunction with an instrument for moving and positioning the sleeves in attaining anastomosis.

The foregoing and other objects, advantages, and features of the invention, and the manner in which the same are accomplished will become more readily apparent upon consideration of the following detailed description of the invention taken in conjunction with the accompanying drawings which illustrate preferred and exemplary embodiments, and wherein:

FIGURE 1 is a perspective view illustrating the prospective assembly of elements of the invention with a vessel end shown in phantom lines;

FIGURE 2 is a perspective view illustrating the manner in which the elements of FIGURE 1 are assembled with the vessel end;

FIGURE 3 is a plan view illustrating the manner in which similarly prepared vessel ends are engaged by an instrument for bringing the vessel ends together in alignment;

FIGURE 4 is a fragmentary sectional view taken along line 4—4 of FIGURE 3;

FIGURE 5 is a plan view illustrating the manner in which the instrument of FIGURE 3 is utilized in bringing the vessel ends together;

FIGURE 6 is a fragmentary sectional view taken along line 6—6 of FIGURE 5;

FIGURE 7 is a similar fragmentary sectional view illustrating the commencement of a suturing step in accordance with the invention;

FIGURE 8 is a further fragmentary sectional view illustrating the completed suturing style;

FIGURE 9 is a plan view illustrating the completed anastomosis; and

FIGURE 10 is a perspective view illustrating a modification of the invention.

Referring to the drawings, and initially FIGURE 1 thereof, in a preferred form the invention employs a split sleeve 10 in the nature of a disc having a central opening 12 to permit the sleeve to be slipped over a blood vessel 14 or the like and having a gap 16 by which the sleeve may be removed laterally from the vessel. The sleeve has a radial projection 18, which as will be described hereinafter, serves to couple the sleeve to a suitable instrument. A plurality of circumferentially spaced pointed prongs 20 project axially from one side of the sleeve. The prongs are hollow and provided with axial outwardly facing slots 22. The periphery of the sleeve is provided with a plurality of outwardly facing axial slots 24 aligned with the slots 22, so as to form a continuation thereof, and is provided with intermediate outwardly facing axial slots 26 midway between the successive prongs. The sleeve and its prongs are formed of suitable materials, such as stainless steel, and the prongs may be set into the slots 24 if desired.

In accordance with an important concept of the invention a ring 28 having a central opening 30 is associated with the sleeve 10 to form a connector assembly for the end of a vessel or the like. The outer diameter of the ring may be about the same or slightly larger than the diameter of the sleeve, but the central openings preferably have the same diameter matching the outer diameter of the vessel. A range of sleeve and ring sizes may be provided to accommodate different size vessels. The ring is provided with a plurality of preformed circumferentially spaced axial openings 32 which extend through the ring and are somewhat larger in cross dimension than the prongs 20, so that the prongs may be received readily therein. In the form shown the number of openings 32 is twice the number of prongs 20, each opening being alignable with a corresponding prong 20 or slot 26. The ring 28 is preferably formed of a material which is absorbable in the human body. Such materials may be collagens of the type disclosed, for example, in U.S. Patent No. 2,900,644 to Rosenberg. The manner in which the invention may be applied to a surgical procedure, such as anastomosis will now be described.

The surgical techniques involved to place a blood vessel, such as a vein or artery, in condition for anastomosis are well known and have been stated in the said copending application Ser. No. 180,462. In general, the vessel is carefully exposed, using a solution such as proline to prevent spasm. The vessel may be denuded of adventitia and then dried. Bulldog clamps or the like may be utilized to interrupt temporarily the blood supply through the vessel in order that a defective or injured portion of the vessel may be excised by the use of a scalpel or similar instrument. The end parts of the vessel which remain may be irrigated with normal saline solution and dried of excess moisture.

In accordance with the invention, a sleeve 10 of the type shown in FIGURE 1 is then slipped over the end of a vessel part 14 by passing the vessel end through the central opening 12 of the sleeve. The prongs 20 are oriented so as to be directed toward the terminus of the vessel (and the prospective anastomosis). The projection 18 of the sleeve is oriented so as to be readily accessible. Then a ring 28 is slipped over the end of the vessel part, and the prongs 20 of the sleeve are passed through the corresponding openings 32 of the ring, being received readily therein by virtue of the somewhat overdiameter relationship of the openings with respect to the prongs. The prongs are made long enough so that they protrude appreciably when the ring is abutted with the sleeve. The assembly of sleeve and ring is positioned somewhat back from the terminus of the vessel, and then the extremity 14a of the vessel is drawn outwardly (partially everted) upon the prongs 20. The pointed prongs readily pierce the vessel wall, and the prongs are made long enough as to protrude from the lumen of the vessel when the vessel abuts the adjacent side of the ring 28 shown in FIGURE 2. The connector assembly is now complete and ready for cooperation with a similar assembly, which may be associated with another vessel part in the same manner. FIGURE 3 illustrates the connector assemblies associated with corresponding vessel parts 14 and 14'. The sleeve 10' is substantially the mirror image of sleeve 10 except that the prongs of sleeve 10' are staggered so as to be aligned with slots 26 of sleeve 10, the prongs of sleeve 10 being aligned with the slots 26 of sleeve 10'. The vessel ends may now be brought together and joined.

As shown in FIGURES 3 and 5, an instrument 34 is utilized to bring the vessel ends together in proper alignment and with controlled abutment pressure of the intima of the respective vessel parts. In order that the anastomosis may be completed as simply and expeditiously as possible, it is preferred that the alignment of the assemblies associated with the vessel ends be predetermined once the sleeves 10 and 10' are engaged by the instrument 34. For this purpose the instrument has a pair of arms 36 and 38 which receive the projections 18 of the sleeves and which are arranged to move toward each other while remaining parallel. The arms may have sockets which match the configuration of projections 18, which may be rectangular. Arms 36 and 38 are pivotally connected to links 40 and 42 and to links 44 and 46. Links 40 and 42 are pivotally connected to a reciprocating bar 48, while links 44 and 46 are pivotally connected to the reciprocating bar at a position spaced from its connection to the first-mentioned links. Further links 50 and 52 are pivotally connected to a central portion of links 40 and 42 and to the end of the handle 54 of the instrument. Arms 36 and 38, links 40, 42, 44, and 46, and reciprocating bar 48 form a parallelogram mechanism. The reciprocating bar 48 is mounted upon the end of a screw 56, which is supported for reciprocating movement within the handle 54. Threaded upon the screw is a nut 58 having a knurled surface exposed through an opening in the handle for digital manipulation. Turning of the nut 58 causes reciprocation of the screw 56 and the bar 48. This causes the links 50 and 52 to pivot about their connection to the handle, in turn causing the links 40 and 42 to pivot about their connection to the bar 48. Relative movement is thus imparted to the arms 36 and 38, which are constrained to remain parallel by virtue of links 44 and 46.

To bring the vessel ends together the projections 18 of the sleeves 10 and 10' are first seated within the sockets of the arms 36 and 38 as shown in FIGURE 3, the relation between a prong 20 of the sleeve 10' and the corresponding slot 26 of the sleeve 10 being shown in FIGURE 4. Nut 58 is now turned to move the sleeves 10 and 10' to the position shown in FIGURE 5. This causes the prongs 20 to penetrate the wall of the opposite vessel end and to enter the corresponding opening 32 and slot 26 associated with the opposite vessel end as shown in FIGURE 6. Because of the staggered relationship between the prongs of the sleeves 10 and 10', the prongs become interdigitated. After the vessel ends have been abutted, the blood flow through the vessel is reinstituted, and the nut 58 is adjusted so as to create just sufficient pressure between the vessel ends to prevent leakage.

It now remains to join the vessel ends in such a manner that the sleeves 10 and 10' may be removed. As shown in FIGURE 7, this is accomplished in accordance with the preferred form of the invention by passing sutures 60, with or without a needle 62, through the hollow slotted prongs 20. A separate suture may be provided for each prong, or the sutures may be continuous. The sutures are tied in any conventional manner, as shown in FIGURES 8 and 9, for example. When the suturing is completed, nut 58 is turned so as to move the sleeves 10 and 10' apart and to withdraw the prongs 20 from the rings 28 and the vessel ends. The sutures pass through the prong slots 22. When the prongs have been withdrawn, the sleeves 10 may be removed from the vessel by a lateral pull, the gaps 16 in the sleeves passing over the vessel with momentary vessel distortion. See FIGURE 1. The anastomosis is now complete. The vessel joint is tight enough to prevent leakage, but without damage to the vessel wall. Pressure is distributed by the ring devices 28 so as to prevent ballooning between the sutures. Moreover, the prong punctures, which tend to close when the prongs are removed, are remote from the actual blood flow path.

The surgical thread 60, like the rings 28, is preferably formed of absorbable material, such as the collagen material previously mentioned. In time the vessel ends become united through natural regenerative processes, and the sleeves and sutures are no longer needed. The absorption time may be predetermined in accordance with the well known techniques for making absorbable materials, so that complete absorption will occur after natural growth has established a reliable junction between the vessel ends. There will then be no foreign matter within in the body. Moreover, even during growth, the absorbable materials are more readily tolerated than nonabsorbable materials.

It may sometimes occur that in everting the end of a vessel, the vessel wall may not assume the substantially smoothly curved configuration shown in FIGURE 2, but instead may be pulled taut between one or more pairs of adjacent prongs so as in effect to form a chord, rather than an arc. If the sleeves were now brought together, and the suturing performed as described above, the chord-like portions of the vessel might not be penetrated by the prongs of the opposite sleeve and might be missed by the corresponding sutures. To avoid defective suturing the chord-like portions of the vessel wall may first be sutured individually to the associated ring 28 by passing sutures through the corresponding openings 32 and slots 26, before the vessel ends are brought together. This will draw the vessel wall into the desired annular shape, and the vessel ends may then be brought together and sutured in the manner previously described, additional sutures being passed through the initially sutured openings 32.

FIGURE 10 illustrates a modification of the invention which eliminates the foregoing problem. Sleeves 64 and 66 are employed in conjunction with rings 68, the sleeves being generally like those previously described, but lacking the intermediate slots 26. Again, outwardly slotted hollow prongs are employed, but the prongs 70 of one sleeve are aligned with the prongs 72 of the other, the latter having a larger diameter so as to accommodate the former in telescoping relationship when the sleeves are brought together. The openings 74 in the rings 68 are preferably made large enough to accommodate the larger prongs with ease of entry. In the use of the modified form of the invention, each vessel end is associated with a sleeve and ring, and the vessel ends are brought together by the use of an instrument, in the manner previously described. The pointed prongs enter the openings 74 of the opposite ring device and telescope with the opposite prongs, slightly widening the punctures in the vessel end associated with the smaller prongs. The suturing may then proceed in the manner previously described, and the sleeves may then be removed.

Since the embodiment of FIGURE 10 does not require the intermediate slots 26 of the embodiment of FIGURE 1, nor the interdigitation of prongs, a lesser number of openings in the rings is utilized for the same number of prongs. However, the number of prongs on each sleeve may be increased, as by employing intermediate prongs.

Although the invention has been described in connection with the anastomosis of blood vessels, it will be apparent that the principles of the invention are applicable to other types of procedures, such as the repair or mending of the intestine or the substitution or transplanting of body members or organs. In the last-mentioned application of the invention the blood vessels of the organ to be transplanted are provided with connector assemblies to match those of the receptive blood vessels. Instruments other than that shown and described may be employed for bringing the sleeves together, and in some instances it may be desirable to have sleeves which are integral with the instrument arms. The sleeves may be disposable, being formed of plastic material, for example. Rings without preformed holes may be utilized if they can be readily pierced by the prongs, although the use of preformed holes is preferred. The number and length of the prongs may be varied somewhat under appropriate circumstances.

While preferred embodiments of the invention have been shown and described, it will be apparent to those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are to be included therein.

The invention claimed is:

1. In a method of anastomosis and the like, the steps of positioning upon the end of a living vessel part an assembly comprising a ring and a plurality of removable prongs which extend through and protrude from said ring, turning the vessel end outwardly upon said protruding prongs and supporting said end thereon, securing said vessel end to said ring independently of said prongs, and removing said prongs from said ring and said vessel end.

2. In a method of anastomosis and the like, the steps of positioning upon the end of a living vessel part an assembly comprising an absorbable ring and a plurality of removable prongs which extend through said ring and protrude from one side thereof, turning the vessel end outwardly upon said protruding prongs and said side of said ring and supporting said end on said prongs. Securing said vessel end to said ring independently of said prongs, and removing said prongs from said ring and said vessel end.

3. In a method of anastomosis and the like, the steps of positioning upon the end of a living vessel part an assembly comprising a ring and a plurality of removable slotted prongs which extend through and protrude from said ring, turning the vessel end outwardly upon said protruding prongs and supporting said end thereon, suturing said vessel end to said ring by passing sutures through said slotted prongs, and removing said prongs from said ring and said vessel end.

4. In a method of anastomosis and the like, the steps of positioning upon the end of a living vessel part an assembly comprising a split sleeve having a plurality of prongs projecting therefrom and a ring through which said prongs extend so as to protrude therefrom, turning said vessel end outwardly upon said protruding prongs and supporting said end thereon, securing said vessel end to said ring independently of said prongs, and removing said split sleeve and its prongs from said ring and said vessel end.

5. In a method of anastomosis and the like, the steps of positioning upon the end of each of a pair of living vessel parts an assembly comprising a ring and a plurality of removable prongs which extend through and protrude from said ring, turning said vessel ends outwardly upon the corresponding protruding prongs, securing said vessel ends and said rings together independently of said prongs, and removing said prongs from said rings and said vessel ends.

6. In a method of anastomosis and the like, the steps of positioning upon the end of each of a pair of living vessel parts an assembly comprising a split sleeve with prongs projecting therefrom toward the other sleeve and a ring with said prongs extending therethrough and protruding therefrom, turning the vessel ends outwardly upon the corresponding protruding prongs, bringing said vessel ends together in alignment, securing said vessel ends and rings together independently of said prongs, and removing said split sleeves and their prongs from said rings and said vessel ends.

7. In a method of anastomosis and the like, the steps of positioning upon the end of each of a pair of living vessel parts an assembly comprising an absorbable ring and a plurality of removable axially slotted prongs which extend through the ring and protrude therefrom, turning the vessel ends outwardly upon the corresponding protruding prongs with the prongs passing through the vessel ends and protruding therefrom, bringing the vessel ends together so that the prongs associated with each end pass through the other vessel end and into the ring associated with the other vessel end, suturing said rings and said vessel ends together by passing sutures through said slotted prongs, and removing said slotted prongs from said rings and from said vessel ends.

8. The method of claim 7, wherein said prongs are brought together in interdigital relation.

9. The method of claim 7, wherein said prongs are brought together in aligned relation and are telescoped.

10. In a method of anastomosis and the like employing a pair of split sleeves each having a plurality of axial prongs extending from one side thereof with the prongs having outwardly facing axial slots and the sleeves having outwardly facing axial slots aligned with the prongs and having additional outwardly facing axial slots intermediate the prongs, the steps of positioning upon the end of each of a pair of living vessel parts an assembly comprising one of said sleeves and a ring through which said prongs extend and protrude toward the other sleeve, turning the vessel ends outwardly upon the corresponding protruding prongs and passing the prongs therethrough so as to protrude therefrom, bringing said vessel ends together with the prongs of each sleeve passing into the intermediate slots of the other sleeve, joining the vessel ends and rings together by passing connector elements through said slots, and removing said sleeves and their prongs from said rings and said vessel ends.

11. In a method of anastomosis and the like employing pair of sleeves, each having a plurality of axial prongs extending from one side thereof with the prongs having outwardly facing axial slots, and the prongs of one sleeve being receivable within the prongs of the other sleeve, the steps of positioning upon the end of each of a pair of living vessel parts an assembly comprising one of said sleeves and a ring through which said prongs extend and protrude toward the other sleeve, turning the vessel ends outwardly upon the corresponding protruding prongs and passing the prongs therethrough so as to protrude therefrom, bringing said vessel ends together with the prongs of each sleeve telescoping with the prongs of the other sleeve, joining said vessel ends and said rings together by passing connector elements through said slots, and removing said sleeves and their prongs from said rings and said vessel ends.

12. In a method of anastomosis and the like, the steps of turning the end of a living vessel part outwardly and impaling said end and a ring upon a plurality of prongs extending from a split sleeve which embraces the vessel part, securing said vessel end to said ring independently of said prongs while supporting said end upon said prongs, removing said prongs from said vessel end and said ring, and removing said sleeve from said vessel part.

13. An anastomosis device comprising a sleeve having a plurality of prongs projecting therefrom, said prongs having outwardly facing axial slots and being open the full length thereof to permit sutures to be drawn through the prongs and later to be withdrawn through the slots.

14. The device of claim 13, said sleeve having outwardly facing axial slots in alignment with the prong slots.

15. The device of claim 13, said sleeve having outwardly facing axial slots intermediate said prongs.

16. The device of claim 13, said sleeve having means for coupling said sleeve to an instrument for moving said sleeve.

17. An anastomosis device comprising a sleeve having a radial split at one side thereof and having a plurality of axial prongs spaced about the periphery thereof with points extending in the same direction, said prongs having outwardly facing axial slots and being open the full length thereof, said sleeve having a coupling means for engaging an instrument for moving said sleeve.

18. An instrument for anastomosis and the like, comprising a pair of split sleeves each having a plurality of axial prongs projecting in the direction of the other and each being adapted to be placed over the end of a living vessel and to have the vessel end turned outwardly upon said prongs, said prongs having outwardly facing axial slots and being open the full length thereof, and means engaging said sleeves for moving said sleeves axially together, whereby said vessel ends may be impaled upon said prongs and brought together between said sleeves.

19. The instrument of claim 18, each of said sleeves having a plurality of outwardly facing axial slots adapted to receive sutures which may be passed through said vessel ends and tied separately from said sleeves.

20. The instrument of claim 19, the prongs of each sleeve being arranged to enter the sleeve slots of the other sleeve.

21. The instrument of claim 18, the prongs of one of said sleeves being arranged to telescope with the prongs of the other sleeve when the sleeves are brought together.

22. The instrument of claim 18, further comprising a pair of rings removably impaled upon the prongs of the corresponding sleeves.

23. The instrument of claim 22, said rings having preformed axial openings receiving said prongs.

24. The instrument of claim 22, said rings being formed of material absorbable in the human body.

25. The instrument of claim 22, said rings being formed of collagen material.

26. The instrument of claim 18, said means comprising a mechanism for adjustably fixing the position of said sleeves while maintaining them in alignment.

27. The instrument of claim 18, said means being readily separable from said sleeves.

References Cited by the Examiner

UNITED STATES PATENTS

| | | | |
|---|---|---|---|
| 834,047 | 10/1906 | Crumrine | 128—303 |
| 1,151,300 | 8/1915 | Soresi | 128—334 X |
| 1,461,958 | 7/1923 | Arnold | 285—330 |
| 2,638,901 | 5/1953 | Sugarbaker | 128—334 |
| 2,940,451 | 6/1960 | Vogelfanger et al. | 128—334 |
| 3,048,177 | 8/1962 | Takaro | 128—334 |

FOREIGN PATENTS

| | | |
|---|---|---|
| 121,533 | 10/1951 | Russia. |
| 137,839 | 4/1960 | Russia. |

OTHER REFERENCES

Lespinasse et al.: "A Practical Mechanical Method of End-to-End Anastomosis of Blood Vessels," from J.A.M.A., Nov. 19, 1910, volume IV, pp. 1785–90.

RICHARD A. GAUDET, *Primary Examiner.*

JORDAN FRANKLIN, *Examiner.*

D. L. TRULUCK, *Assistant Examiner.*